United States Patent [19]

Franklin et al.

[11] Patent Number: 5,026,974
[45] Date of Patent: Jun. 25, 1991

[54] METHOD FOR RECOGNIZING THE LEADING EDGE OF A CHARACTER IN E13B FONT

[75] Inventors: Gene R. Franklin, Kitchener; Benedict C. M. Ho, Waterloo, both of Canada

[73] Assignee: NCR Corporation, Dayton, Ohio

[21] Appl. No.: 457,623

[22] Filed: Dec. 27, 1989

[51] Int. Cl.⁵ .............................................. G06K 9/18
[52] U.S. Cl. .................................... 235/449; 382/7; 382/29
[58] Field of Search .................... 235/379, 449, 493; 382/7, 29, 53, 64

[56] References Cited

U.S. PATENT DOCUMENTS

| | | | |
|---|---|---|---|
| 3,219,974 | 11/1965 | Rabinow | 340/146.3 |
| 3,302,174 | 1/1967 | Djinis et al. | 340/146.3 |
| 3,528,058 | 9/1970 | Bond | 382/7 X |
| 3,535,682 | 10/1970 | Dykaar et al. | 382/29 |
| 3,571,793 | 3/1971 | Britt | 340/146.3 |
| 3,818,446 | 6/1974 | Benson | 235/448 X |
| 3,987,411 | 10/1976 | Kruklitis et al. | 340/146.3 |
| 4,143,355 | 3/1979 | MacIntyre | 235/449 X |
| 4,143,356 | 3/1979 | Nally | 340/146.3 |
| 4,245,211 | 1/1981 | Kao | 382/7 |
| 4,315,246 | 2/1982 | Milford | 235/449 X |
| 4,326,258 | 4/1982 | De La Guardia | 382/7 |
| 4,356,472 | 10/1982 | Hau-Chun Ku et al. | 340/146.3 |
| 4,381,494 | 4/1983 | Wisner | 235/449 X |
| 4,547,899 | 10/1985 | Nally et al. | 382/7 |
| 4,594,732 | 6/1986 | Tsuji | 382/9 |
| 4,797,938 | 1/1989 | Will | 235/449 X |
| 4,845,348 | 7/1989 | Ho et al. | 235/449 |

Primary Examiner—Stuart S. Levy
Assistant Examiner—Steven M. DuBois
Attorney, Agent, or Firm—Wilbert Hawk, Jr.; Albert L. Sessler, Jr.; Elmer Wargo

[57] ABSTRACT

A method for locating the start of a MICR character in E13B font so as to facilitate character recognition. A Calculated Character Start Position (CCSP) is generated by using a predetermined number of voltage samples corresponding to a portion of MICR waveform generated by reading a MICR character on a document. The CCSP is generated by averaging the predetermined number of voltage samples within the window which tends to minimize the harmful effects of noise. Noise from magnetic ink spatter is sometimes wrongly interpreted as the start of a character. A process of "jiggling" is used to assist character recognition techniques by utilizing different character start positions to determine whether or not a template match in character recognition techniques occurs when the new or different character start position is used. Dynamic thresholding is used to avoid false starts or "ringing" due to an immediately previous character which was read having a high intensity waveform compared to the normal intensity expected. The method also employs a technique of having a variable starting point for the search for the start of the next character, with the variable starting point being based on the character just recognized.

8 Claims, 7 Drawing Sheets

METHOD FOR RECOGNIZING THE LEADING EDGE OF A CHARACTER IN E13B FONT

BACKGROUND OF THE INVENTION (1) Field of the Invention

This invention relates to a method for recognizing the leading edge of a character printed in magnetic ink in E13B font.

(2) Background Information

Documents like checks and deposit slips used in the banking industry, for example, have certain key data printed on the documents in magnetic ink in particular fonts, like E13B. The key data includes, bank number, customer account number, document or check number, and the monetary amount of the document, for example. The documents with this key data thereon are processed by banking machines, like proof and sorting machines. The processing is effected by moving the documents with the key or MICR data thereon in reading relationship with a magnetic or MICR reader positioned along a document track included in the banking machines. As a document is moved in the document track past the MICR reader, waveforms are generated by the MICR reader. Each character within a particular font is printed so as to have its own individual waveform generated by the MICR reader. One characteristic of E13B font is that each character within the font always starts with a positive-going waveform to indicate the start of a character. The output signals from the MICR reader are processed for thresholding, for example, and then they are processed by character recognition circuitry to identify the waveforms being read as being indicative of individual characters within that particular font.

There are four general situations which cause problems with the reading of characters which are printed in E13B font. These situations are:

1. Characters which are not printed according to predetermined specifications. These include characters with ragged edges, characters with broken elements, and characters with missing elements. Even though a character is printed correctly, initially, some of the situations mentioned here may develop through abusive handling of the document on which the characters are printed.

2. Characters with extraneous MICR ink spatter nearby. This is commonly referred to as EIF.

3. Characters with pitch problems. Character pitch is most easily defined as the distance between the rightmost edge of one character to the rightmost edge of an adjacent character printed in the same font.

4. Misreads. A "misread" occurs when the character recognized by the recognition circuitry is not the same as the corresponding actual character appearing on the document.

The situations mentioned cause rejects to occur when the documents are being read by a MICR reader. The rejects occur at a typical reject rate of about 2%. When documents are fed or moved past a MICR reader at a rate of 400 to 500 documents per minute, even a reject rate of only 2% generates a large number of documents which have to be reprocessed.

SUMMARY OF THE INVENTION

An object of this invention is to lower or improve the reject rate for reading MICR characters printed in E13B font and to improve the reject rate in a simple and inexpensive manner.

One of the features of this invention relates to improved techniques for finding the start or leading edge of a character. As previously stated, each character within the E13B font starts with a positive-going waveform. If the leading edge of a character is correctly identified, the chances for correctly reading the character are enhanced.

In one aspect of a preferred embodiment of this invention, there is provided a method of determining the start of a character in character data printed on a document in magnetic ink in which the start of a character included in said character data always begins with a positive-going signal, and in which the characters in said character data are formed of various combinations of positive peak values, negative peak values, and substantially zero values, said method comprising the steps of:

(a) moving said document in reading relationship with a magnetic reader to generate a waveform corresponding to the character data on said document;

(b) sampling said waveform at periodic times to generate voltage samples;

(c) finding a positive-going voltage sample from step (b) which exceeds a predetermined threshold level;

(d) using said positive-going voltage sample from step (c) to initiate the start of an examining window whose duration is equal to a predetermined number of said voltage samples;

(e) examining the voltage samples within said examining window from the start thereof to an end thereof to find the highest voltage sample therein;

(f) examining said voltage samples in an examining order proceeding from the highest voltage sample from step (e) towards the start of said examining window to find a point at which one of said voltage samples becomes negative or the start of said examining window is reached to thereby include a group of positive voltage samples within this examining step;

(g) obtaining a calculated average for the voltage samples included in the group of voltage samples from step (f);

(h) finding the first voltage sample in said group of voltage samples which is greater in voltage than the calculated average from step (g); and (i) using said first voltage sample from step (h) as the calculated character starting position (CCSP) for character recognition.

The above objects and features, along with others, will be more readily understood in connection with the following description, claims, and drawing.

DESCRIPTION OF THE PREFERRED EMBODIMENT

Figure 1:
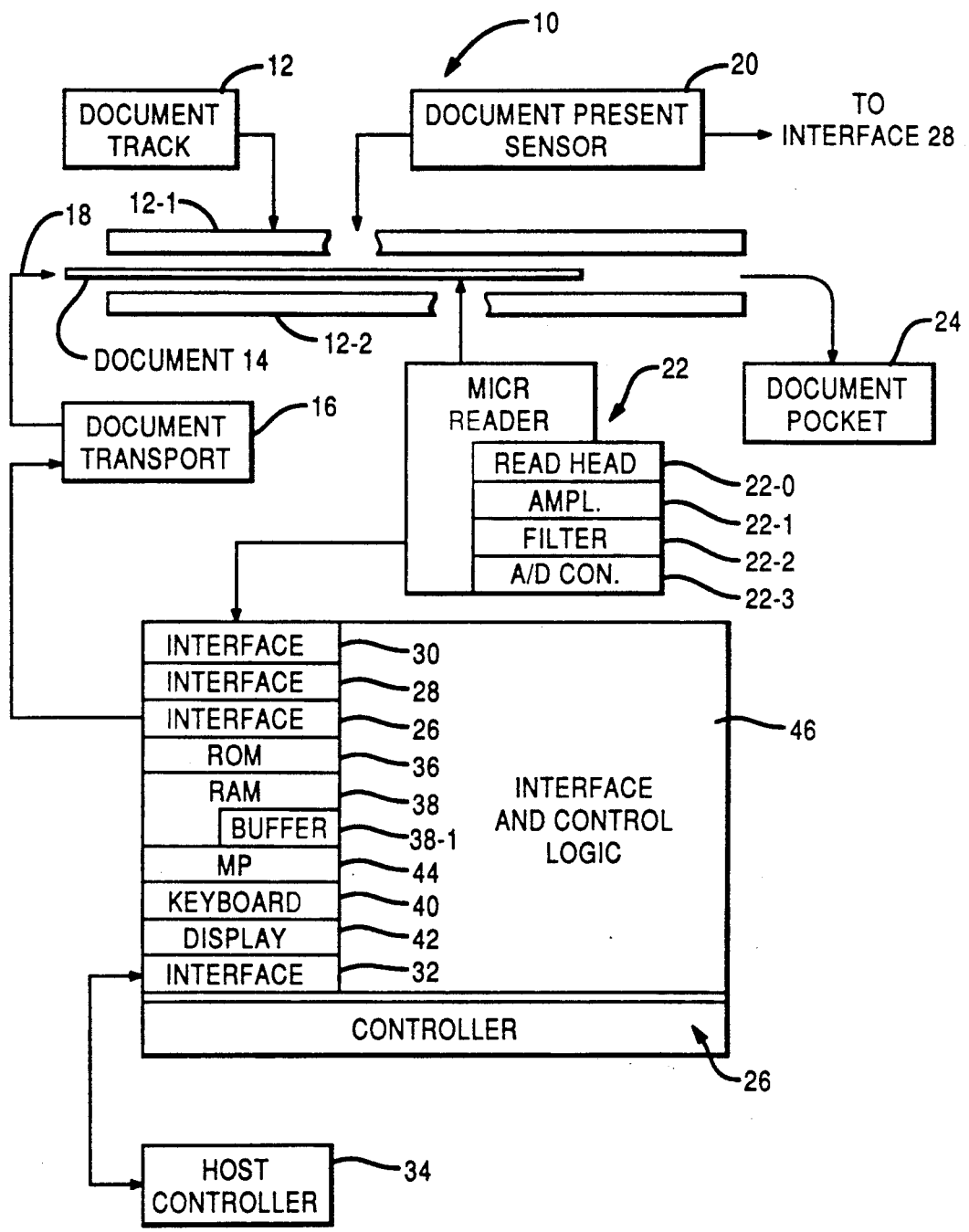
FIG. 1 is a general schematic view, in block form, showing a preferred form of a reader or apparatus of this invention, with the top edge of a document to be read being shown. The apparatus also includes a controller for effecting the method of this invention.

FIG. 1 is a general schematic view of a reader or apparatus 10 of this invention. The apparatus 10 includes a document track 12 having upstanding side walls 12-1 and 12-2 which are spaced apart to receive a document 14 therebetween. A document transport 16 is used to move the document 14 along the document track 12 (in the direction of arrow 18) in reading relationship with a document present sensor 20 and a MICR reader 22. After reading by the MICR reader 22, the document 14 read is deposited in a document pocket 24. Those elements mentioned in this paragraph are conventional and operate in a conventional manner; consequently, further discussion of these elements is not deemed necessary.

The means for controlling the operation of the apparatus 10 includes a controller 26 as shown in FIG. 1. The controller 26 itself is conventional; however, the form of the controller 26 shown is a functional, schematic representation to facilitate a discussion of the various functions performed by this controller.

The controller 26 has a plurality of interfaces 26, 28, 30, and 32 (FIG. 1) to couple this controller to the various elements included in the apparatus 10. Interface 26 is used to couple the controller 26 to the various sensors and motors (not shown) which are included in the document transport 16. Interface 28 receives the output from the document present sensor 20 which informs the controller 26 of a document approaching the MICR reader 22. Interface 30 receives the output of the MICR reader 22, and interface 32 is used to couple the controller 26 to a host controller 34 where necessary or desirable.

The controller 26 also includes a read only memory (ROM) 36, a random access memory (RAM) 38, a keyboard 40, a display 42, and a microprocessor (MP) 44. The various elements included in the controller 26 are all interconnected by interface and control logic 46 to enable the controller 26, itself, to function conventionally.

The method of this invention may be implemented by software routines, for example, which may be down loaded from the host controller 34 into the RAM 38 of the controller 26, or the routines may be incorporated in the ROM 36 of the controller 26. Before discussing the method of this invention, it seems appropriate to discuss the basic steps which are included in processing MICR characters.

The general, the basic steps in processing the waveforms from MICR characters in E13B font are as follows:

1. Find character data and then accurately determine the start of a character in the character data. It should be recalled that a character printed in E13B always starts with a positive going waveform.

2. Extract the "features" from the waveform associated with a character and position these features relative to the start of the associated waveform. It should be recalled that the features include "positive peak values", "negative peak values", and "substantially zero values" which are positioned relative to the start of the first positive going waveform and which are arranged in predetermined combinations for the characters within the E13B font.

3. Match the extracted "features" against all the templates for the E13B font. A template is essentially the particular combination of positive, negative and substantially zero values and the positions they are allowed to occupy for an individual character.

4. Apply character recognition rules to the extracted "features" to determine if the features actually match the features included in one of the templates well enough to be recognized as that particular character.

As stated in the Summary Of The Invention, one of the features of this invention relates to improved techniques for finding the start of the leading edge of a character printed in the E13B font. If the start of a character is found more accurately, then there is a greater probability of reading that character correctly. This invention uses a "window" in the method of finding the leading edge of a character, and also uses "average" calculations in this method. Another feature is that poorly formed or "skinny" characters are accepted by the method of this invention instead of being rejected as extraneous matter or noise as is true of some prior art methods.

Figure 2:
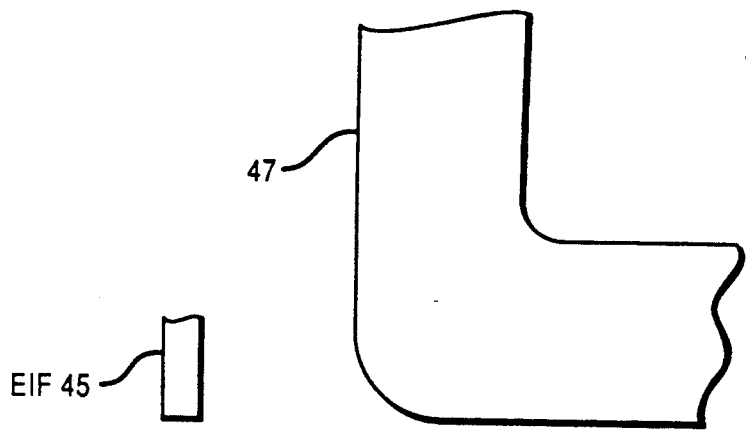
FIG. 2 is a diagrammatic view showing ink spatter or EIF near the leading edge of a portion of a character.
Figure 2A:
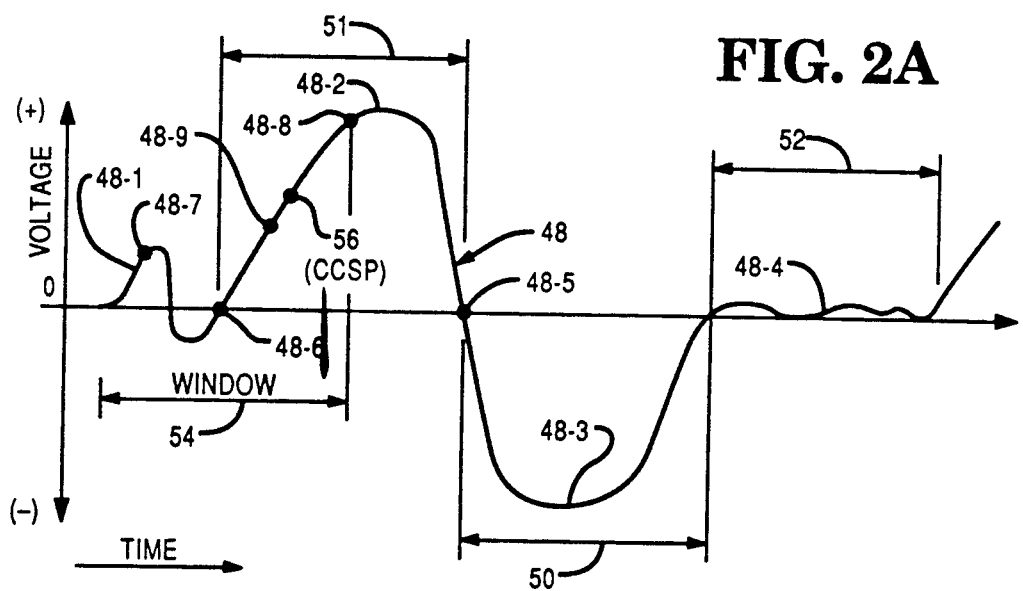
FIG. 2A shows a waveform associated with the ink spatter and a portion of a waveform associated with the portion of the character shown in FIG. 2.

One of the situations mentioned earlier herein which causes problems in reading E13B data relates to characters with extraneous MICR ink spatter nearby. FIG. 2 is a diagrammatic view which shows ink spatter or EIF 45 near the leading edge 47 of a portion of a character, and FIG. 2A shows a waveform 48 associated with both the EIF 45 and the character shown; this waveform 48 is derived from the MICR reader 22 shown in FIG. 1. There is a positive going portion 48-1 associated with the ink spatter 45 and and a positive going portion terminating in a peak 48-2 for a portion of a waveform associated with the portion of the character shown. Waveform 48 is not an actual waveform, but it is used simply to illustrate certain features of this invention. As an aside, the MICR reader 22 (FIG. 1) may include additional conventional circuits, like an amplifier 22-1, a filter 22-2, and an analog/digital converter 22-3, which are not important to an understanding of this invention. The filter 22-2 filters out some noise associated with reading the MICR characters, and the converter 22-3 converts an analog signal from the read head 22-0 into eight bit bytes of data which are processed by the controller 26. In the embodiment described, the eight bit bytes of data are sampled at a rate of 128,000 per second or 7.8 microseconds per sample. Certain thresholding functions are performed by software stored in the RAM 38, for example; this aspect will be discussed later herein.

Returning to the waveform 48 (FIG. 2A), this waveform includes a positive-going portion 48-1 which is actually caused by the MICR ink spatter (or EIF 45) being near the leading edge 47 of the portion of the character shown. Because the portion 48-1 is a positive-going pulse, it can be misinterpreted as the start of a character.

For a character to be recognized in E13B font, it is necessary that the positive, negative, and substantially zero peak values be located in the expected time zones. Because there is a first positive peak 48-2 (FIG. 2A) for every character in this font, this first peak 48-2 is not useful in identifying a particular character within the font; however, the first peak is useful in identifying the start of a character. The waveform 48 does have a negative peak 48-3 located in a time zone indicated by double arrow 50 and a substantially zero value located in a time zone indicated by the double arrow 52. In effect, there are seven such time zones, like those shown by double arrows 50 and 52, for each character within the font discussed in addition to the time zone shown by double arrow 51. Because this first time zone (double arrow 51) is always positive for all characters within the font, it does not aid in identifying a character. Some characters in E13B font are narrower than others and do not have features in all seven time zones. For example, the character "1" is narrower than the number "0", and consequently, "1" will have fewer features than "0". The last time zone for any character will, however, always include a negative peak for an E13B character. The start of a character, like that shown in FIG. 2, always includes a positive peak value in the time zone shown by double arrow 51 which is shorter (although not shown that way) than the remaining seven time zones, and it may be considered an eighth time zone. Under ideal conditions, if the characters on a document were printed within standards and the document were moved past the MICR reader 22 at the specified speed, then magnetic waveforms corresponding to the characters would be generated. The waveform for a character would have positive peak values, negative peak values, and substantially zero values (which are used to identify the character within the E13B font) falling within the expected time zones like those shown by double arrows 50 and 52.

As stated earlier herein, one of the first steps in the method of this invention is to look for a positive-going pulse which generally indicates the start of a MICR character in E13B font. Because the first positive-going pulse may be magnetic ink spatter as discussed in relation to portion 48-1 in FIG. 2, several samples of the waveform 48 are taken at periodic times during a window shown by double arrow 54. The number of samples taken is basically dependent upon the rate at which documents 14 are fed past the MICR reader 22. Enough samples should also be taken to reflect the typical sizes of ink spatter generally encountered and to include the start of a legitimate character. In the embodiment described, the document feed rate past the MICR reader 22 is 104 inches per second. With an average mix of documents 14 ranging in length from four to six inches, the throughput rate is about 400 documents per minute. The width of window 54 reflects 13 samples being taken at a periodic rate of 128,000 samples per second. The window 54 starts at the start of the positive portion 48-1 of the waveform 48 and ends when the 13 samples are taken.

The voltage samples which are taken are digital values (8 bits) which are stored in a buffer 38-1, for example, within the RAM 38. These 13 samples in window 54 (FIG. 2) are examined to find the highest positive value (48-8) within the window 54. Note that there is no reason why the highest value within a window must occur at the end of a window; however, the highest positive value 48-8 occurs at the end of the window 54 in this instance. Once the highest positive value is found, the controller 26 begins a calculation to find a "calculated character start position" which shall be referred to hereinafter as CCSP. By starting with the highest positive value 48-8 within a window 54, and by working towards the start of window 54 (left side in FIG. 2), all of the voltage samples within the window 54 are summed up until the beginning of the window is reached or until the sampled voltages go negative as indicated by point 48-6. A calculated average 48-9 is then generated by the controller 26 by dividing the sum of the voltage samples obtained by the number of samples included in the sum.

The average calculated in the previous paragraph is used to find the CCSP in the following manner. In the example being discussed, the procedure starts at the earliest positive point 48-6 (FIG. 2) in the positive-going waveform or the the beginning of a window if the waveform did not go negative. Thereafter, the voltage values included in the window 54, when proceeding towards the highest positive value 48-8 in the end of the window 54, are examined to find the first sample value which is above the average previously calculated. In the example being discussed, the voltage value at 56 becomes the first value above the calculated average 48-9, and accordingly, the voltage value at 56 becomes the CCSP. If the sample voltage values being examined fall below the calculated average mentioned, then the CCSP which is obtained is not valid and the search continues in the forward direction (towards the right of window 54, as viewed in FIG. 2). Once the highest value (point 48-8) in the example being discussed is reached, the process for finding the CCSP is terminated. The steps in the method just described can be summarized as follows:

(1) Start the window 54 at a positive going pulse;

(2) Examine voltage samples in the window 54 until the highest positive voltage sample 48-8 is reached within the window 54;

(3) Examine the voltage samples in the window 54 while proceeding from voltage sample 48-8 towards the start of the window 54 to find the point 48-6 where the sample values go negative or the start of the window 54 is reached;

(4) Sum the voltage samples included in the portion of window 54 from point 48-6 to voltage sample 48-8;

(5) Divide the sum from step (4) by the number of voltage samples included in the portion of the window 54 recited in step (4) to obtain a calculated average which is shown as 48-9 in FIG. 2; and (6) Examine the voltage samples starting at point 48-6 and proceeding towards the end of the window 54 to find the first voltage sample which is above the calculated average shown as 48-9. This first voltage sample above the calculated average becomes the CCSP which is shown as point 56 in FIG. 2. Naturally, the summing of the value samples may be effected while examining the voltage samples as discussed in step 3 if convenient.

A prior art method for finding the start of a MICR character entailed taking voltage samples as soon as the voltage samples went above a certain threshold value. These voltage samples were "summed" until the samples turned negative or until 16 voltage samples had been summed. The average was calculated by dividing the sum by the number of samples taken to generate an average sample value. The CCSP for this waveform was obtained by selecting the first voltage sample above the average sample value calculated. With the prior art method, a CCSP at point 48-7 (FIG. 2) would be obtained. In the example being described, the start of the waveform at 48-1 (FIG. 2) actually represents noise.

In contrast, the method of this invention selects the correct CCSP by "hopping over" the noise at 48-1 through the use of the window 54, for example. If some point on the positive-going side of the portion 48-1 were used as the start of a character instead of some portion (like at point 56) of the waveform 48, it is apparent that the time zones represented by double arrows 50 and 52 would be displaced relative to the true start of the character which appears near point 56. The CCSP, in effect, defines the origin of the windows or zones used in character recognition. It should be recalled that the positive, negative, and substantially zero values which define a character in E13B font must fall within predetermined windows or zones in order to identify a character correctly. If the CCSP is located improperly, then the features which are extracted from windows or zones based on this improperly located CCSP will be in error. Hence, the character recognition will be in error.

In some situations, the method of this invention may be used to supplement some other apparatus or other method for reading MICR characters. If the CCSP or point 56 is close to the start of a character determined by the other method or apparatus, then the other method or apparatus may be used in the character recognition process. If the method of this invention is the only character reading process being used to read MICR characters, then point 56 as determined in the prior paragraph would be used to indicate the start of a character.

Figure 3:
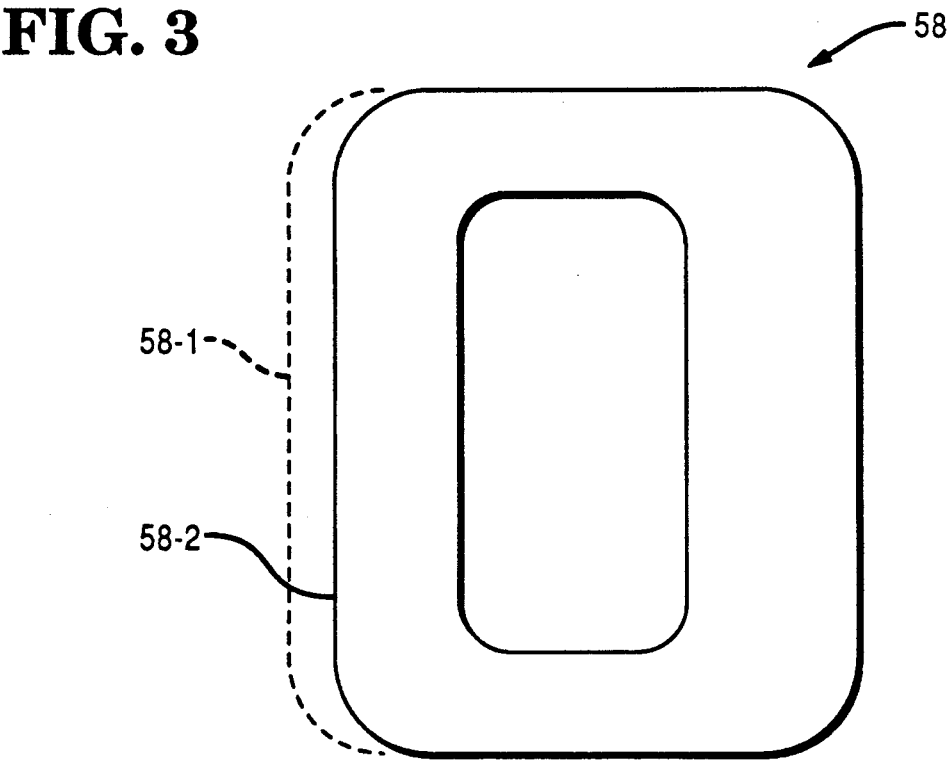
FIG. 3 is an enlarged view of a character "zero" which has the portion of the character (as viewed in FIG. 3) which did not print properly shown dashed outline.
Figure 4:
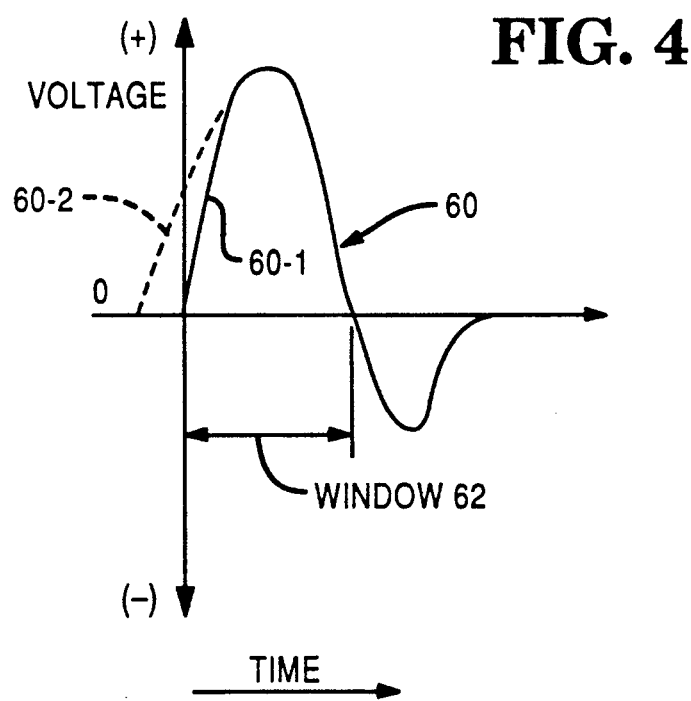
FIG. 4 is a diagrammatic view of a MICR waveform associated with the character shown in FIG. 3.

FIG. 3 is an enlarged view of a character which is used to illustrate some of the problems associated with characters which are not printed properly. For example, the character 58 can be recognized as a "zero"; however, it is apparent that the left edge of the character 58 did not print properly (i.e. it's too narrow) as shown by dashed line 58-1, and the actual left edge of the character 58 starts at the solid line 58-2. FIG. 4 is a portion of a MICR waveform 60 for the character 58, with the waveform 60 being positioned under the character 58 so that portions of the waveform 60 correspond to portions of the character 58 shown above. For the arrangement of the document 14 and the direction of feeding shown in FIG. 1, it is actually the right side of the character 58, as viewed in FIG. 3, which would be read first as the document moves past the MICR reader 22. However, for ease of illustration, the left side of the character 58 is shown as being read first.

The waveform 60 shown in FIG. 4 has a very steep, positive-going portion 60-1 which reflects the edge 58-2 or narrowed portion of the character 58 shown in FIG. 3, while the dashed line 60-2 reflects the more normal positive-going portion which occurs when the character starts normally at the dashed line 58-1 in FIG. 3. With prior art MICR readers, the steep portion 60-1 (FIG. 4) associated with the character 58 would probably be rejected as magnetic ink spatter because it is more narrow than the width of a character line. With the method of this invention, if the window shown by double arrows 62 contains three or fewer periodic voltage samples, then the portion 60-1 is considered as noise and is rejected. If the window shown by double arrows 62 (FIG. 4) contains four or more periodic voltage samples, then the window may contain a valid positive-going portion 60-1 which reflects the start of a character. In essence, the method of this invention, in using a window, like 62, for finding the start of a character, provides a higher confidence level of being able to "hop over" the EIF or noise as previously discussed when compared to prior art methods. With the method of this invention, the apparatus 10 is able to accept narrow waveforms (like that shown in FIG. 4) as being for a valid character because if these narrow waveforms are due to noise, the window like 62 in FIG. 4 will be able to ignore the noise.

Figure 5:
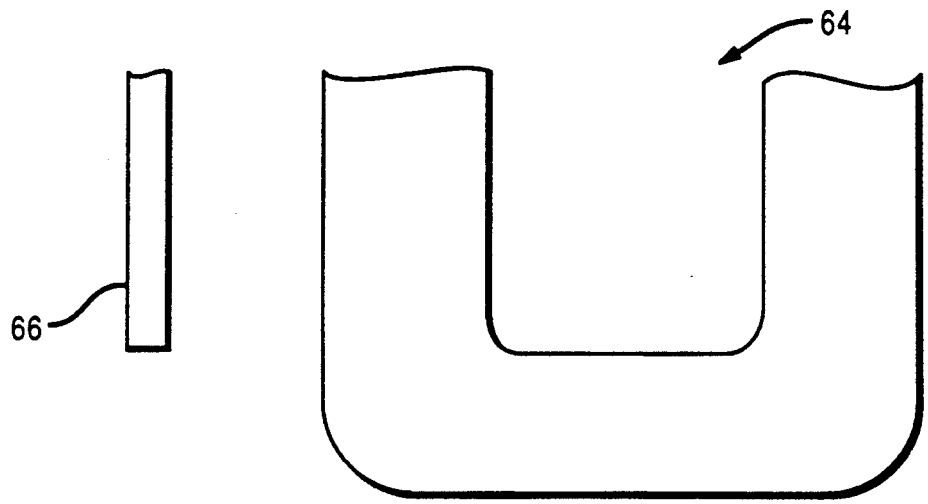
FIG. 5 is an enlarged view of a portion of the character "zero" which has ink spatter near the start of the character.
Figure 6:
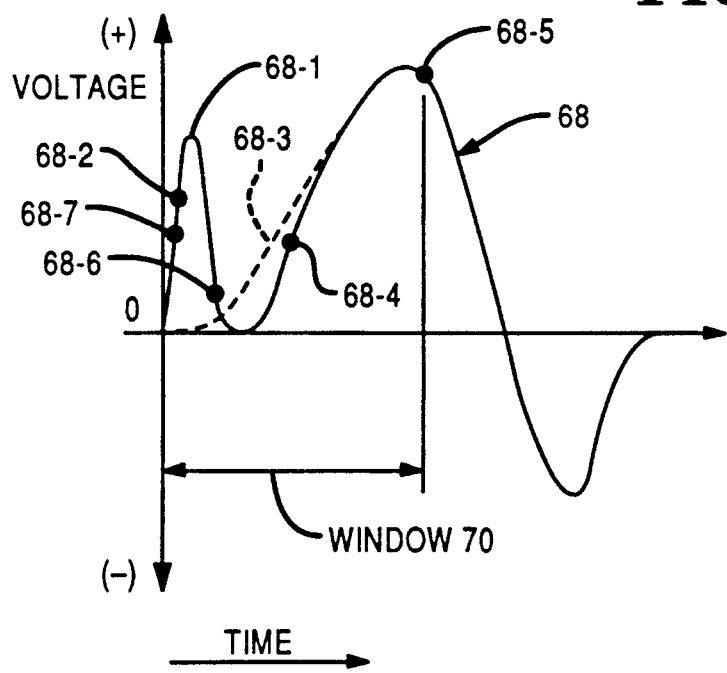
FIG. 6 is a diagrammatic view of a MICR waveform associated with the character shown in FIG. 5.

FIG. 5 is an enlarged view of a portion of the character "zero", with this figure being used to illustrate a problem of having too many points above a threshold which could be interpreted as the start of character 64. FIG. 5 shows a long spike 66 of extraneous magnetic ink which extends along the edge of the character 64. Because the spike 66 is so long, it produces a strong signal or a tall narrow portion or spike 68-1 in the corresponding MICR waveform 68 shown in FIG. 6. The spike 68-1 exceeds the threshold set for eliminating noise, and consequently, the spike 68-1 may be considered, improperly, as the start of a new character under some of the prior art systems, with the start appearing at point 68-2. If there were no ink spatter or spike 66, as shown near the character 64, the ideal waveform for the character 64 would start at the dashed line 68-3 shown in FIG. 6.

With this present invention, the window 70 (FIG. 6) is used to obtain the 13 periodic voltage samples in the embodiment described. As previously discussed in relation to FIG. 2, prior art methods might indicate that a CCSP occurs at point 68-2 in FIG. 6, which CCSP would be above the calculated average 68-7. However, it is apparent that point 68-2 is not the highest voltage sample within the window 70. Notice, also, that at area 68-6 there is a point where the voltage samples fall below the calculated average; therefore, the previous CCSP, which was at point 68-2 in the example being described, is considered invalid. When continuing the examination process as previously described, point 68-4 is found to have exceeded the calculated average, so it is designated as the CCSP. The highest voltage sample is found at point 68-5 within the window 70, so the search for finding the CCSP is terminated. In essence, the controller 26 looks for an average or point which occurs towards the end of the period or window 70 when more than one positive-going signal occurs during a window, like 70. Compared to the prior art method discussed earlier herein, the method of this invention picks a more accurate CCSP at point 68-4 instead of picking one at point 68-2.

Another problem which occurs when reading MICR data or characters relates to overcoming residual effects which are known as "ringing" effects. The ringing effects occur when the reading of a character of high magnetic intensity is completed and the start of the reading of the next character is to begin. This situation is presented in FIG. 7 which shows an end portion of a waveform 72 for a previous character which was read and which also shows a beginning portion of a waveform 74 for the current character being read at the MICR reader 22. The voltage peaks 72-1 and 72-2 for the waveform 72 are considerably higher and lower than the voltage peaks 74-1 and 74-2 for the waveform 74 for the current character being read. The ringing effects associated with the waveform 72 occur in the area included in bracket 76. These ringing effects are generally proportional to the intensity of the peaks in the MICR characters.

Figure 7:
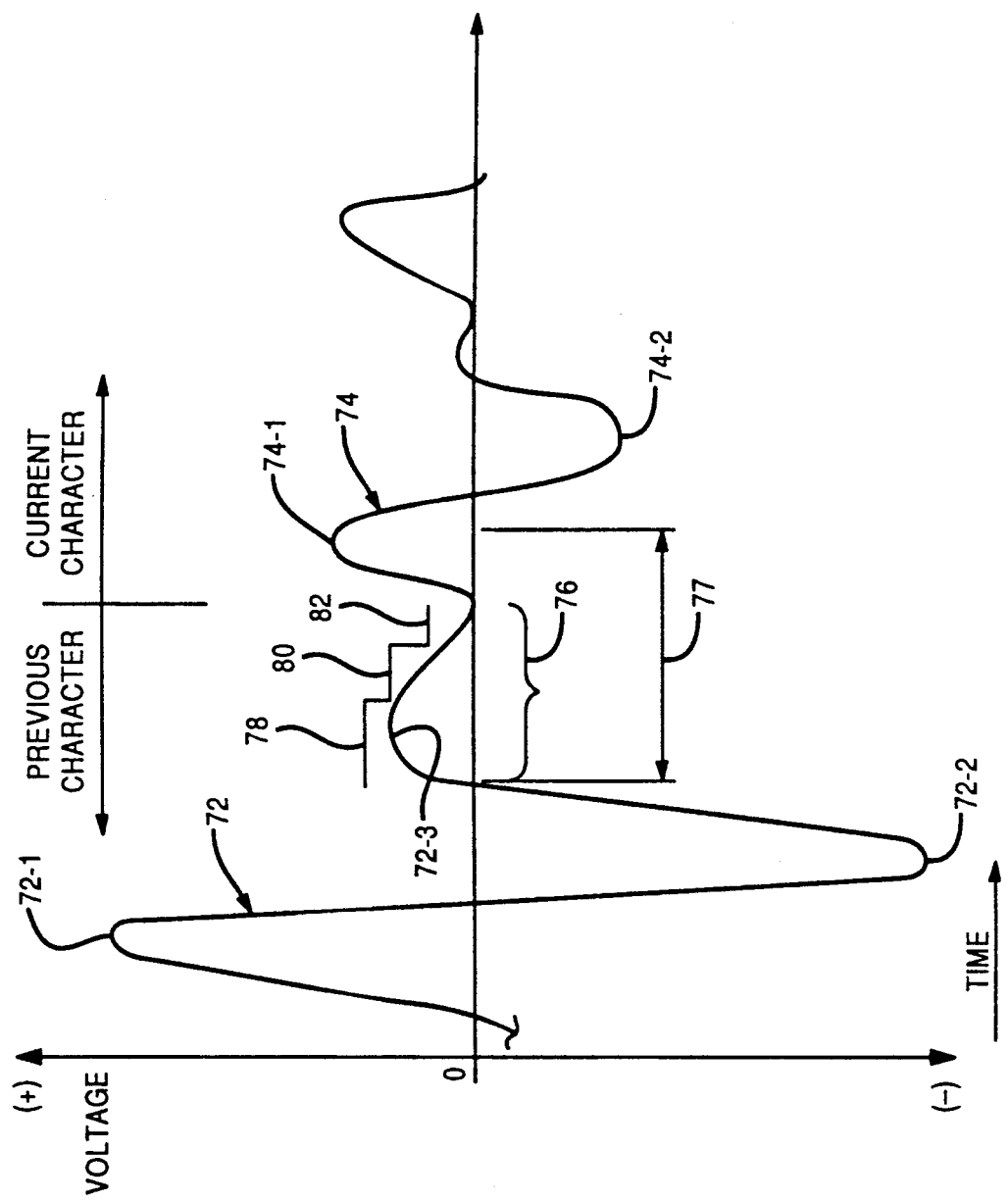
FIG. 7 shows a diagrammatic view of a portion of a MICR waveform extending between the end of a previous character and also shows a starting portion of a MICR waveform of a current character being read.

One known way of handling the ringing effects being discussed in relation to FIG. 7 was to not attempt to "read any character" between the end of one high intensity character and the start of the next character being read. In effect, the region defined by double arrows 77 could be considered a "dead zone" in which any activity is this region is ignored.

The problem with a dead zone (double arrows 77) as discussed in the previous paragraph, is that there may be times when an actual character begins in this zone. This can happen when characters are printed too close together instead of being printed according to the E13B specifications. In the example shown in FIG. 7, if there were no reading done in the zone (double arrows 77), the reader 10 would miss the first peak 74-1 of the start of the waveform 74 for a new character or the current character as shown in FIG. 7.

Before discussing the ringing effects mentioned, it seems appropriate to discuss thresholding as used in the apparatus 10. Thresholding is used to eliminate some of the noise which usually occurs during the reading of MICR data. Naturally, the thresholds which are set are dependent upon the variables of a particular application. Some of the variables include, for example, the nature of the documents being scanned, the quality of the printing on the documents, the amount of ink spatter or EIF associated with the documents, and the strength of the signals generated by the MICR reader 22. In the embodiment described, for example, typical positive and negative peak values have absolute values of about two volts. Certain thresholds are set, empirically, relative to the anticipated two volts. For example, a Threshold Level #1 is set at 0.080 volts when the voltage sample coming from the A/D converter 22-3 is two volts, and a Threshold Level #2 is set at 0.120 volts when the voltage sample coming from the A/D converter 22-3 is three volts. The remaining Threshold Levels #3 through #8 are set using various multiples of a 40 millivolt value. For example, a midrange or Threshold Level #5 is set at (6×0.040) or 0.240 volts, and the top range or Threshold Level #8 is set at (9×0.040) or 0.360 volts. Naturally, different values and different numbers of Threshold Levels may be used depending upon a particular application.

In the present invention, the positive-going pulses like 48-1 and 48-2 shown in FIG. 2A must exceed certain threshold levels to be considered, potentially, as the start of a character. For example, it is necessary that there be four consecutive voltage samples above Threshold Level #1 and two consecutive voltage samples above Threshold Level #2 before a positive-going pulse is considered as a potential character start. This situation is true for all the examples discussed previously herein.

The Threshold Levels #1-#8, just discussed, are implemented through using software included in the RAM 38. The ringing effects alluded to previously herein, are handled, to some degree, by thresholding. For example, when a valid character is found, the last zone within the time zones for a character contains a negative peak value as indicated by the peak 72-2 associated with the waveform 72 shown in FIG. 7. The software for implementing this invention recognizes that peak 72-2 is the last peak in the character represented by the waveform 72, and so the software examines the voltage value of the peak 72-2 which represents the trailing portion of a character. It should be recalled that the waveform 72 represented a high intensity character. The software stored in RAM 38 detects the value of the voltage samples associated with waveform 72 as being considerably higher than the voltage samples associated with the normal waveforms anticipated in the apparatus 10. Consequently, the software sets the threshold at a level which is higher than the usual amount in anticipation of the ringing effect (shown in bracket 76 in FIG. 7) which is bound to ensue. In general, the larger the negative peak, like 72-2 in FIG. 7, the larger the ringing (shown by 72-3) will be. The following are examples as to how thresholds would be set for signals of varying intensities:

(1) For low intensity characters, use Thresholds #1 and #2;

(2) For medium intensity characters, use Thresholds #3 and #4;

(3) For high intensity characters, use Thresholds #5 and #6; and (4) For extremely high intensity characters, use Thresholds #7 and #8. For example, the threshold may be set at Threshold Level #5 for the start of the next character which is referred to as the "Current Character" in FIG. 7. With the Threshold Level set at #5, as illustratively represented by the horizontal line 78 in FIG. 7, the ringing effect, as represented by portion 72-3 of the waveform 72, lies below the Threshold Level #5, and consequently, this portion 72-3 is not considered in determining the start of a character.

The method of this invention also includes reducing the threshold level in "step fashion" for subsequent voltage samples received as shown by horizontal lines 80 and 82, for example. The start of a new character, as represented by the portion 74-1 of the waveform 74, would then be subjected to the various tests associated with Threshold Levels #1 and #2 as previously discussed. The thresholding just described is referred to as dynamic thresholding in that it changes with respect to changing conditions associated with noise levels and previous characters, as well as the distance from a previous character, for example. To some degree, the thresholding mentioned tends to enlarge the examining window in that it tends to eliminate "false starts" as far as locating the start of a character is concerned.

Figure 8:
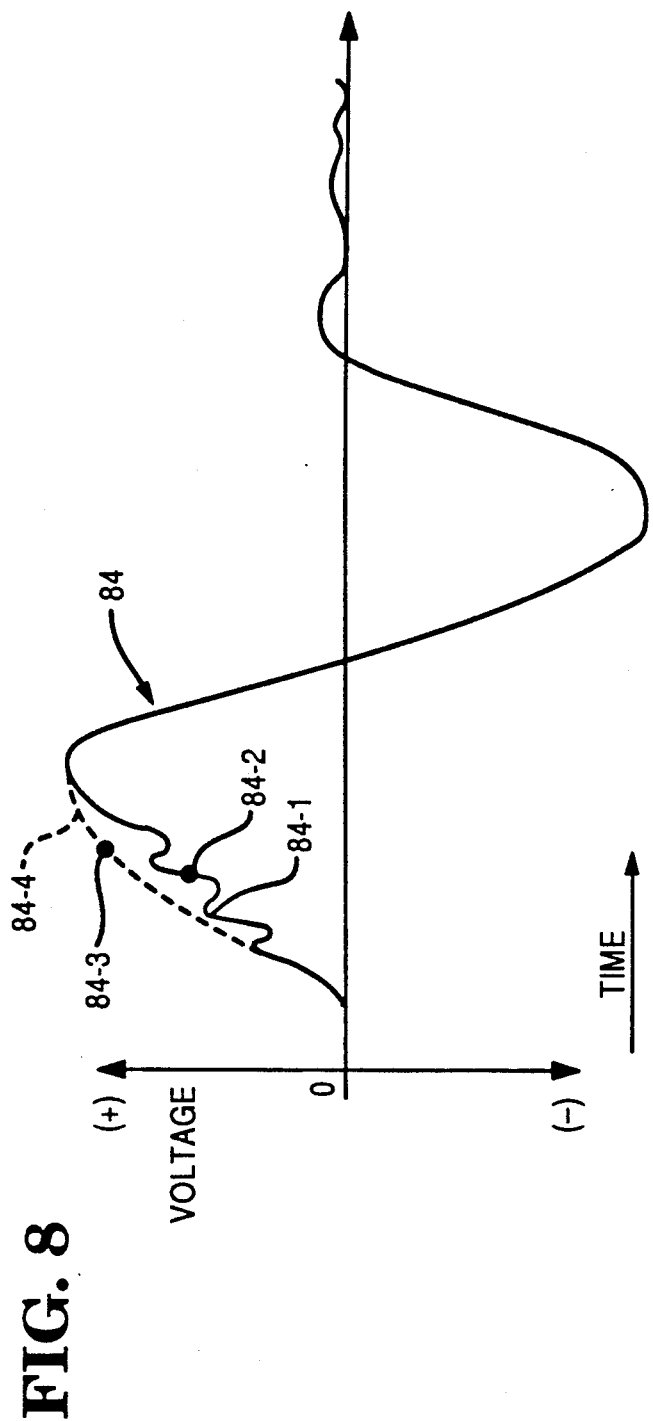
FIG. 8 shows a portion of a MICR waveform which is associated with a character which has a "fuzzy" leading edge.
Figure 9:
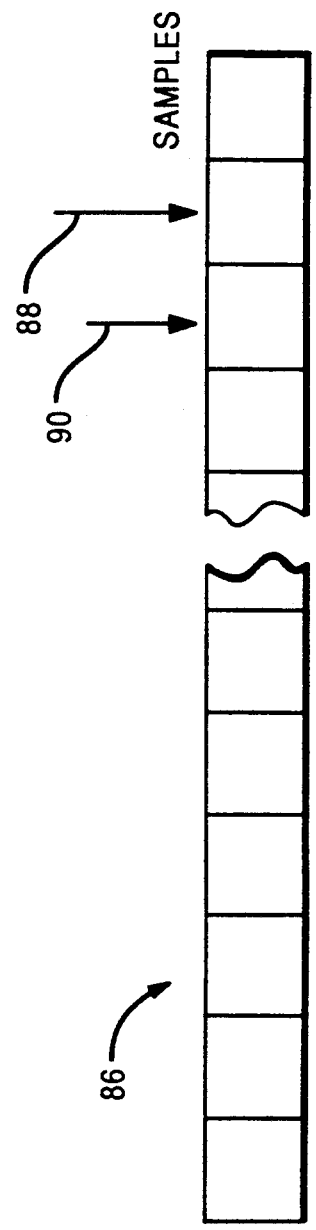
FIG. 9 is a diagrammatic view of a portion of a buffer shown in FIG. 1.

FIG. 8 shows a portion of a MICR waveform 84 which results from a character (not shown) which has a non-sharp or "fuzzy" leading edge 84-1. Because of the fuzzy leading edge 84-1, the CCSP for this leading edge occurs at point 84-2 which is slightly below the point 84-3 which lies in dashed line 84-4 which represents the ideal waveform if the leading edge did not have the fuzziness mentioned. If the CCSP shown at point 84-2 is used, it is conceivable that the rest of the features which are extracted for this particular character may not match well enough when "template matching" is employed during character recognition processes to identify the character represented by the waveform 84. To assist in solving this problem, the method of this invention includes storing the voltage samples derived in an array 86 which is part of the buffer 38-1. The array 86 is shown only diagrammatically in FIG. 9 and includes a plurality of voltage samples which are stored in the array 86 which is one byte high as shown; it should be recalled that the voltage samples are eight bit bytes. In the embodiment described, the height of the array is equal to one sample, with the samples being taken at a rate of 128,000 samples per second and with the start of the data coming in at the right side of the array 86. In other words, the array 86 may contain all the voltage samples for all the characters expected on the document 14. Naturally, if the memory available for use is less than this, the buffer 38-1 may be used to process five characters, for example, on a document 14.

The array 86 (FIG. 9) is used for a process which is referred to as "jiggling". This process is used to extract the features of a character stored in the array 86, using a different or adjusted CCSP to determine whether or not these features "fit" another character during template matching in a character recognition technique or process. For example, if the point 84-2 shown in FIG. 8 is used as the start of a character, this point 84-2 is used as an address to access the data in the array 86, starting at the sample represented by arrow 88. This array of data starting at sample 88 is then processed by conventional character recognition techniques (like template matching) to determine whether or not the array contains an identifiable character. If the template matching process does not produce a recognizable character, it may be that the samples in the array 86 are just slightly offset relative to the start of the character so as to prevent a match. The data may then be "jiggled" or the CCSP of the character may be changed to see whether or not a new CCSP for the character may cause the samples in the seven time zones to be properly located relative to this new starting point. In FIG. 8, the new starting point may be point 84-3 which is located later along the time axis compared to point 84-2. This new starting point 84-3 is then used as pointer or an address (as shown by arrow 90) for the array 86 to determine whether or not a template match occurs for this new starting point. If no template match occurs by this "jiggling" process mentioned, then the document 14 on which this particular character (associated with this waveform) is located may be rejected.

Figure 10:
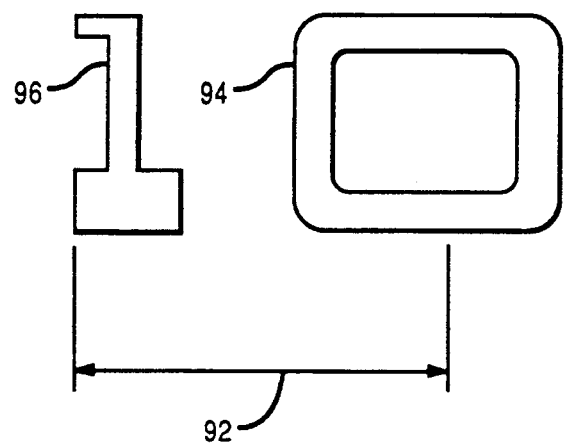
FIG. 10 is a diagrammatic or plan view of two characters used to illustrate a "pitch" problem within a particular font.

As alluded to earlier herein, the character pitch may be defined as the distance between the rightmost edge of one character and the rightmost edge of an adjacent character printed in the same font. For E13B font, the pitch is defined as 0.125 inch. It is apparent that all characters within E13B font do not have the same width. For example, the character "1" is narrower than a "0". Sometimes during the printing of character within this font, the next character printed may be printed too close to the character "1". In FIG. 10, the pitch of 0.125 inch (shown in enlarged scale) is represented by the double arrows 92. This means that the leading edge 94 of the character "0" is printed too close to the leading edge 96 of the character "1".

Figure 11:
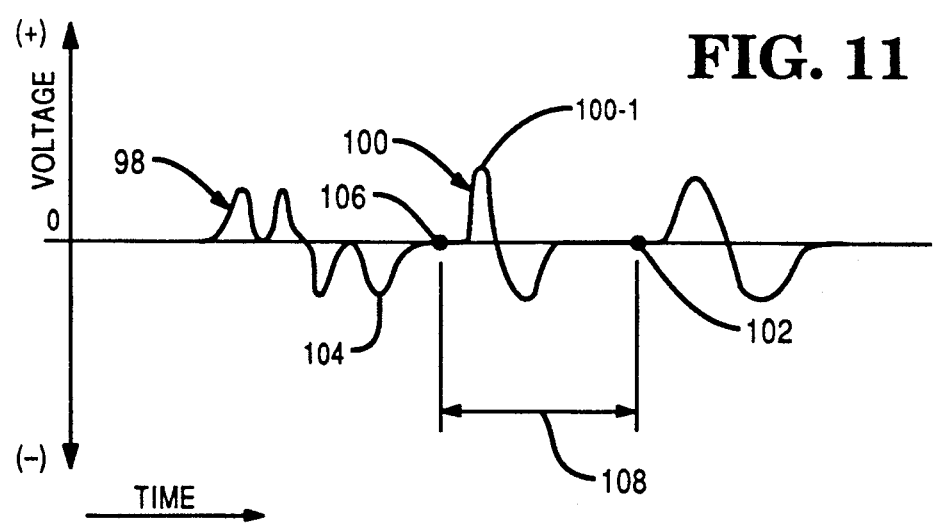
FIG. 11 shows a waveform corresponding to the two characters shown in FIG. 10.

FIG. 11 shows the waveform 98 of the character "1" and also shows the waveform 100 of the character "0", with these waveforms being located under their associated characters shown in FIG. 10. It should be recalled that for ease of illustration, the waveforms 98 and 100 are shown as being read from left to right, when in reality, the characters are read from right to left as viewed in FIG. 1.

In prior art systems, the character "1" would be found and recognized; however, the systems would not begin to look for the next character until dictated so by the normal character pitch associated with the E13B font. This point in time is indicated as point 102 in FIG. 11 which corresponds to the end of the pitch designated by double arrows 92 in FIG. 10. Because the characters shown in FIG. 10 are printed closer to each other than dictated by the E13B font, the first positive going pulse 100-1 of the waveform 100 would be missed because it falls in a time period when no valid data is expected. With the first positive-going pulse 100-1 of character "0" being missed by the prior art systems, the character "0" in FIG. 10 would be recognized improperly along with any following characters on the document 14 being read.

In the method of the present invention, the character "1" in FIG. 10 would be recognized correctly; however, upon successful recognition, the controller 26 knows where the end of the character "1" occurs due to the negative peak 104 which ends E13B characters. The controller 26 starts to look for the next positive-going peak at point 106 which occurs prior to the end of the normal pitch. The normal time for looking for the next character occurs at point 102 as specified by the E13B font, assuming that the characters were printed properly and that the document with the MICR characters thereon is moving at the planned velocity past the MICR reader 22. Because the voltage samples like 88 and 90 are stored in the array 86, as discussed in relation to FIG. 9, it is a simple matter for the controller 26 to calculate a new pointer or address of the location in the buffer 38-1, which address corresponds to the point 106 in FIG. 11. Thereafter, the controller starts a new window 108 to begin the search for the positive-going pulse 100-1 for the next character as discussed earlier herein. Naturally, the technique of specifying a location as to where to start looking for the start of a succeeding character is extended to all the characters in the E13B font, and the starting location is based upon the character just recognized.

What is claimed is:

1. A method of determining the start of a character in character data printed on a document in magnetic ink in which the start of a character included in said character data always begins with a positive-going signal, and in which the characters in said character data are formed of various combinations of positive peak values, negative peak values, and substantially zero values, said method comprising the steps of:
   (a) moving said document in reading relationship with a magnetic reader to generate a waveform corresponding to the character data on said document;
   (b) sampling said waveform at periodic times to generate voltage samples;
   (c) finding a positive-going voltage sample from step (b) which exceeds a predetermined threshold level;
   (d) using said positive-going voltage sample from step (c) to initiate the start of an examining window whose duration is equal to a predetermined number of said voltage samples;
   (e) examining the voltage samples within said examining window from the start thereof to an end thereof to find the highest voltage sample therein;
   (f) examining said voltage samples in an examining order proceeding from the highest voltage sample from step (e) towards the start of said examining window to find a point at which one of said voltage samples becomes negative or the start of said examining window is reached to thereby include a group of positive voltage samples within this examining step;

(g) obtaining a calculated average for the voltage samples included in the group of voltage samples from step (f);

(h) finding the first voltage sample in said group of voltage samples which is greater in voltage than the calculated average from step (g); and (i) using said first voltage sample from step (h) as the calculated character starting position (CCSP) for character recognition.

2. The method as claimed in claim 1 in which said examining step (e) is effected by storing said voltage samples sequentially in a buffer.

3. The method as claimed in claim 2 in which said method is effected for character data printed in E13B font.

4. The method as claimed in claim 3 in which said using step (i) includes the steps of:

(i-1) storing the remaining voltage samples for said character data in said buffer; and (i-2) finding the end of the character whose CCSP was found in step (i).

5. The method as claimed in claim 4 in which said using step (i) includes the step of:

(i-3) recognizing the character from step (i-2) by using the voltage samples starting with the CCSP and ending with the end of the character as determined in step (i-2).

6. The method as claimed in claim 5 in which said method also includes the step (j) using the character recognized in the recognizing step (i-3) for specifying a location as to where to start looking for the positive-going pulse associated with a succeeding character.

7. The method as claimed in claim 5 in which said recognizing step (i-3) is effected by using an adjusted CCSP which is located on either side of the CCSP appearing in said buffer.

8. The method as claimed in claim 1 in which said using step (d) is effected by (d-1) maintaining the duration of said examining window for a predetermined number of voltage samples equal to 13.

* * * * *